(12) United States Patent
Beaudin

(10) Patent No.: US 8,518,250 B2
(45) Date of Patent: Aug. 27, 2013

(54) APPARATUS FOR LIQUID SEPARATION DURING AGITATION

(76) Inventor: Laurent Beaudin, Edmonton (CA)

( * ) Notice: Subject to any disclaimer, the term of this patent is extended or adjusted under 35 U.S.C. 154(b) by 267 days.

(21) Appl. No.: 13/153,822

(22) Filed: Jun. 6, 2011

(65) Prior Publication Data

US 2011/0303596 A1    Dec. 15, 2011

Related U.S. Application Data

(60) Provisional application No. 61/353,144, filed on Jun. 9, 2010.

(51) Int. Cl.
  E02B 15/04    (2006.01)
  B01D 17/028   (2006.01)
  B01D 17/02    (2006.01)

(52) U.S. Cl.
  CPC .......... *E02B 15/045* (2013.01); *E02B 15/046* (2013.01); *B01D 17/0211* (2013.01); *Y10S 210/923* (2013.01); *Y10S 210/05* (2013.01)
  USPC ........ 210/242.3; 210/521; 210/540; 210/923; 210/DIG. 5; 428/116

(58) Field of Classification Search
  USPC .................. 210/170.05, 170.11, 242.1, 242.3, 210/242.4, 521, 522, 540, 747.6, 776, 922, 210/923, 924, DIG. 5; 428/116, 118
  See application file for complete search history.

(56) References Cited

U.S. PATENT DOCUMENTS

| | | | | | |
|---|---|---|---|---|---|
| 3,613,889 | A | * | 10/1971 | Reed | 210/242.1 |
| 3,669,275 | A | * | 6/1972 | Downs | 210/242.4 |
| 3,804,251 | A | * | 4/1974 | Farrell et al. | 210/242.3 |
| 3,850,807 | A | * | 11/1974 | Jones | 210/170.05 |
| 3,966,614 | A | * | 6/1976 | Ayers | 210/242.3 |
| 4,053,414 | A | * | 10/1977 | in'tVeld | 210/DIG. 5 |
| 4,305,819 | A | * | 12/1981 | Kobozev et al. | 210/242.1 |
| 4,346,005 | A | * | 8/1982 | Zimmerman | 210/521 |
| 5,106,444 | A | * | 4/1992 | Corey et al. | 428/116 |
| 7,670,675 | B2 | * | 3/2010 | Heselhaus | 428/116 |
| 8,343,352 | B2 | * | 1/2013 | Dagesse | 210/924 |
| 2003/0222025 | A1 | * | 12/2003 | Archuleta | 210/242.4 |
| 2006/0261006 | A1 | * | 11/2006 | Ursel | 210/521 |

OTHER PUBLICATIONS

Oil/Water Separators Brochure, Brentwood Industries, Water Technology Group, Sep. 2001.

* cited by examiner

*Primary Examiner* — Christopher Upton
(74) *Attorney, Agent, or Firm* — Davis & Bujold, PLLC

(57) ABSTRACT

An apparatus for separating liquids during agitation includes a support and a honeycomb cellular structure supported by the support. The cellular structure has a top and a bottom. It is formed from a plurality of enclosed cells, which limit and re-direct liquid movement in all directions so that agitation of the support has a negligible co-mingling effect enabling a liquid separation interface to be established within the cellular structure. Each cell has an inlet and an outlet, which are out of register creating a non-linear migration path from the bottom to the top of the cellular structure. A capture assembly is provided to capture less dense liquids after separation has occurred.

8 Claims, 4 Drawing Sheets

APPARATUS FOR LIQUID SEPARATION DURING AGITATION

FIELD

There is described an apparatus that is capable of separating liquids having differing densities in an environment in which an agitation of the liquids would otherwise promote co-mingling.

BACKGROUND

It is difficult to skim surface oil from a turbulent body of water, as wave action tends to promote co-mingling of the oil with the water. In order to address this problem, attempts have been made to remove co-mingled water and oil from the surface of the turbulent body of water and use a separator mounted in a marine vessel to separate the oil and the water into an oil stream that is captured and a water stream that is returned to the turbulent body of water. It has been found that the wave action of the turbulent body of water rocks the marine vessel, promoting co-mingling within the separator and hindering the separation process. What is required is an apparatus that is capable of separating liquids having differing densities, notwithstanding environmental agitation.

SUMMARY

There is provided an apparatus for separating liquids during agitation, which includes a support and a honeycomb cellular structure supported by the support. The cellular structure has a top and a bottom. It is formed from a plurality of enclosed cells, which limit liquid movement in all directions so that agitation of the support has a negligible co-mingling effect enabling a liquid separation interface to be established within the cellular structure. Each cell has an inlet and an outlet, which are out of register creating a non-linear migration path from the bottom to the top of the cellular structure. A capture assembly is provided to capture less dense liquids after separation has occurred.

The apparatus has cells, which enclose the liquid within them and limit movement of the liquid in all directions so that agitation becomes less of an issue. Separation can then take place as a result of difference in density. In separation of oil and water, oil, being less dense than water will tend to float on the water. An oil-water interface becomes established within the cellular structure with oil above the oil-water interface and water below the oil-water interface. A capture assembly can then be used to remove the separated oil.

The design of the multiple flow paths (ranging in million of optional paths extending from base to surface) allows the co-mingled liquids to separate by means of reducing wave effects promoting lighter density fluid opportunity to percolate through the membrane along various non-linear paths. The lighter fluid can slip along the easiest path and rise quickly enabling varied liquids to separate. The lighter fluid can then remain at the surface even though the carrier marine vessel motion typically assists co-mingling of various density liquids. The unique honeycomb prevents much co-mingling and allows the less contaminated lighter liquids to be captured and stored.

There will hereinafter be described a number of ways in which this technology may be deployed. The technology can be used inside separation vessels, where agitation would otherwise be an issue. The technology can be used in bodies of water in place of skimmers. The technology can be incorporated into the structure of a boat.

The intention is to enable separation of large volumes of oil contaminated within oceans/lakes/holding ponds/rivers/ or other waterways. The devices are passive three dimensional multi directional non-channeling honeycomb dispersion membrane structure deployed (1) first as an integral part of the skimming boom to allow some initial separation (2) and then allow a high performance vacuum system to strip off the upper layer oil (3) the vacuum mechanically transfers the higher concentration oil (still containing some water) into (4) a tall vertical vessel (separator) with one or more inlets and multiple outlets (5) separator vessel is located on a tow vessel or barge (6) the tall vertical separator chamber also contains a passive three dimensional multi directional non-channeling flow dispersion honeycomb permeable membrane structure which allows further separation and returns less contaminated water to the ocean and the oil to be recaptured to a holding compartment

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
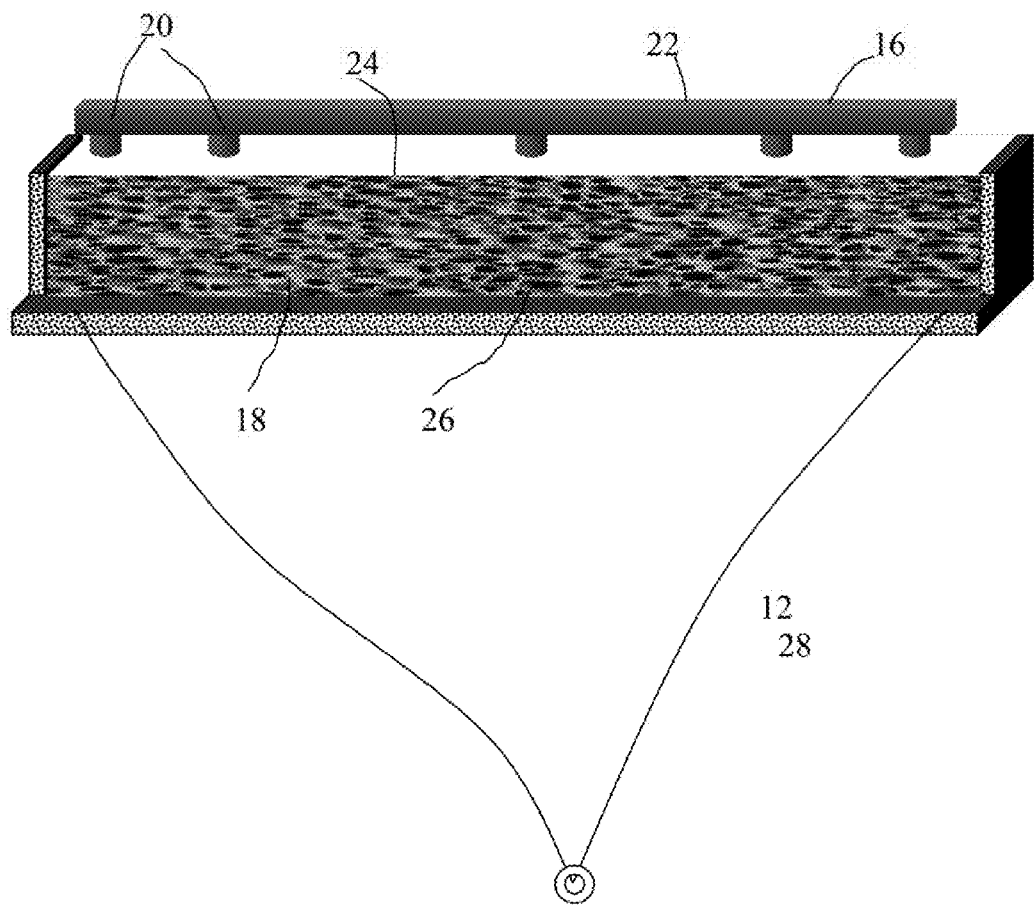
FIG. 1 is a perspective view of the apparatus for liquid separation during agitation incorporated into a partially submerged, floating boom.

An apparatus for liquid separation during agitation generally identified by reference numeral 10, will now be described with reference to FIG. 1 through 5.

Figure 4:
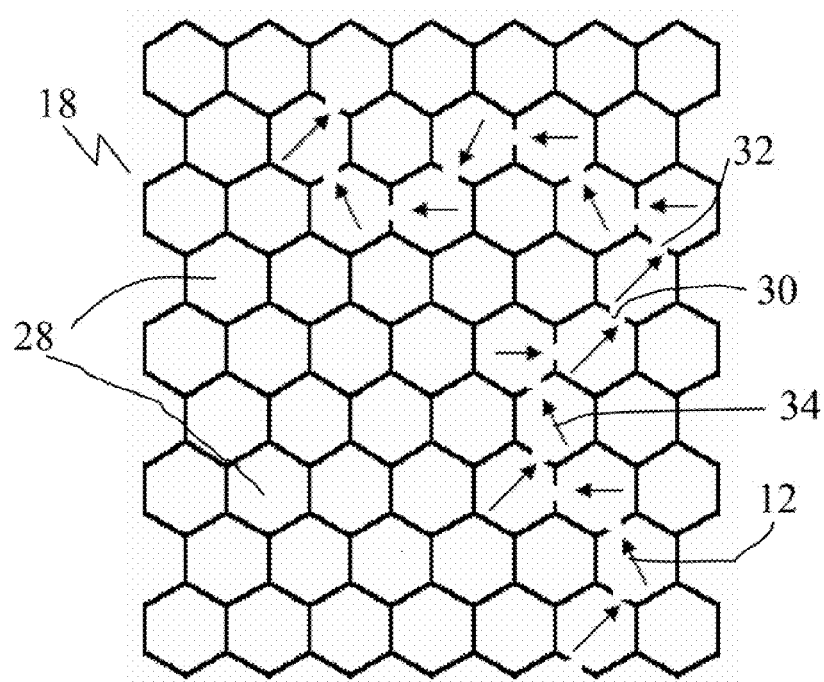
FIG. 4 is a detailed side elevation view of the apparatus for liquid separation illustrated in FIG. 1 through 3.
Figure 5:
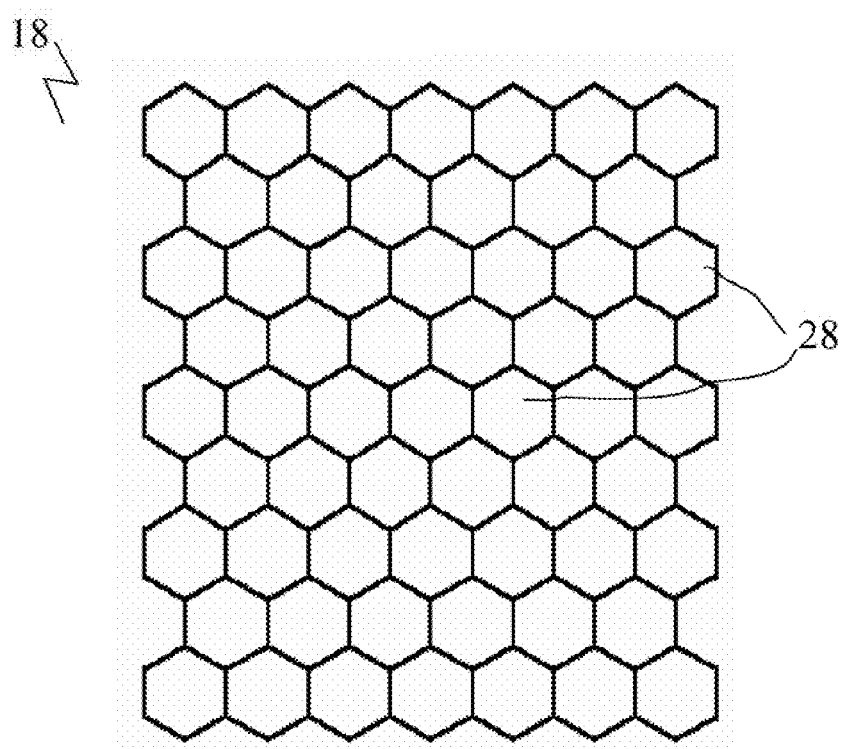
FIG. 5 is a detailed top view of the apparatus for liquid separation illustrated in FIG. 1 through 3.

Referring to FIG. 4 and FIG. 5, the design of the multiple flow paths 12 (ranging in million of optional paths extending from base to surface) allows the co-mingled liquids to separate by means of reducing wave effects promoting lighter density fluid opportunity to percolate through the membrane along various nonlinear paths. The lighter fluid can slip along the easiest path and rise quickly to enable liquids separation. The lighter fluid can then remain at the surface even though the marine carrier vessel motion typically assists co-mingling of various density liquids. The unique honeycomb 18 prevents much co-mingling and allows the less contaminated lighter liquids be captured and stored.

Figure 3:
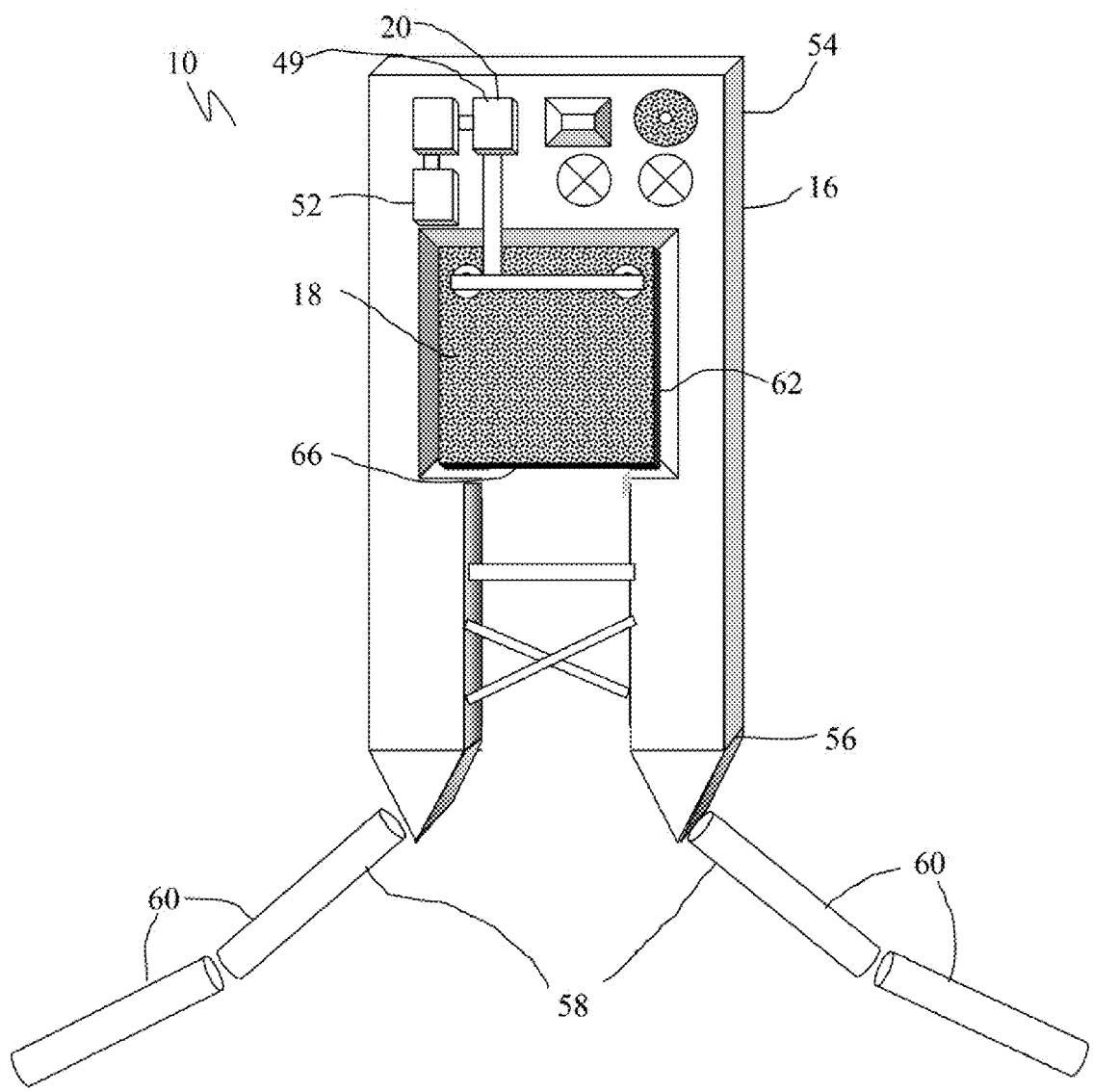
FIG. 3 is a top plan view of the apparatus for liquid separation during agitation incorporated into a barge.

Separator Action at Semi-Submersible Floating Boom Structure and Relationship of Parts:

Referring to FIG. 1, an apparatus for separating liquids during agitation 10 includes a support 16, a honeycomb cellular structure 18 and a capture assembly 20. As shown, support 16 is a float or boom 22 which supports honeycomb cellular structure 18 in a partially submerged state within a body of water, however it will be understood that other types of supports 16 may be utilized in conjunction with honeycomb cellular structure 18. Honeycomb cellular structure 18 has a top 24 and a bottom 26. Referring to FIGS. 4 and 5, honeycomb cellular structure 18 is formed from a plurality of enclosed cells 28 which limit and re-direct liquid movement in all directions so that agitation of the support has a negligible co-mingling effect. This enables a liquid separation interface to be established within honeycomb cellular structure 18. Each cell has an inlet 30 and an outlet 32 which are out of register to create a non-linear migration path 34 from bottom 26 to top 24 of honeycomb cellular structure 18. Once the liquids have separated and the lighter liquid has made its way to top 24 of honeycomb cellular structure 18, the lighter liquid will be captured by capture assembly 20. Referring to FIG. 3, capture assembly 20 may be in the form of a vacuum 49, however it will be understood that various assemblies may be used to capture liquid from honeycomb cell structure 18.

Operation:

The three dimensional multi direction non-channeling porous permeable honeycomb cellular structure 18 prevents flow channeling and breaks the co-mingling by altering the flow dynamics in multiple directions allowing initial separation and concentrating distinct fluid types affected passively by gravitational forces. There exists no singular two dimensional direct flow channel but rather, a multitude of indirect paths first causing dispersion through honeycomb 18 by virtue of multi directional paths all being interconnected and afterwards causing concentration of varied fluid types. The lighter density fluid travels through the membrane based on easiest path flow dynamics and least resistance and is provided numerous outlets 32 to enhance separation and promote coalescing. The design also intentionally disturbs any attempt to flow directly along a specific channel which ultimately improves opportunity for separation by restricting wind and wave effects which cause co-mingling.

The intent is to begin fluids separation on the ocean surface through first calming the oil/water mixture and then begin breaking the co-mingling activity. This is done by varying the orifice size of the membrane of the honeycomb structure to best suit the oil API gravity and fluid pressure gradient and the surface tension.

The oil is initially forcibly separated by the action of moving boom 22 through the water in forward motion or by currents thereby driving the lighter density fluid to rise within the honeycomb dispersing membrane and breaking any channeling affects through the design of the membrane. Then concentrating the separated liquids at different heights within the membrane. The buoyancy of the semi-submersible boom 22 can be adjusted to allow separated liquids to be more easily accessed for vacuuming to a holding tank.

With the now less contaminated oil being nearer to the surface of honeycomb 18 it can be mechanically vacuumed off top 24 of honeycomb structure 18 and deposited into a holding compartment 52 on a tow vessel or other marine support vessel 54, shown in FIG. 3.

Non-Linear Flow Non-Channeling Flow-Dispersion & Separator Typically Positioned Onboard the Tow Vessel or Other Marine Vessel Such as Ship or Barge.

Figure 2:
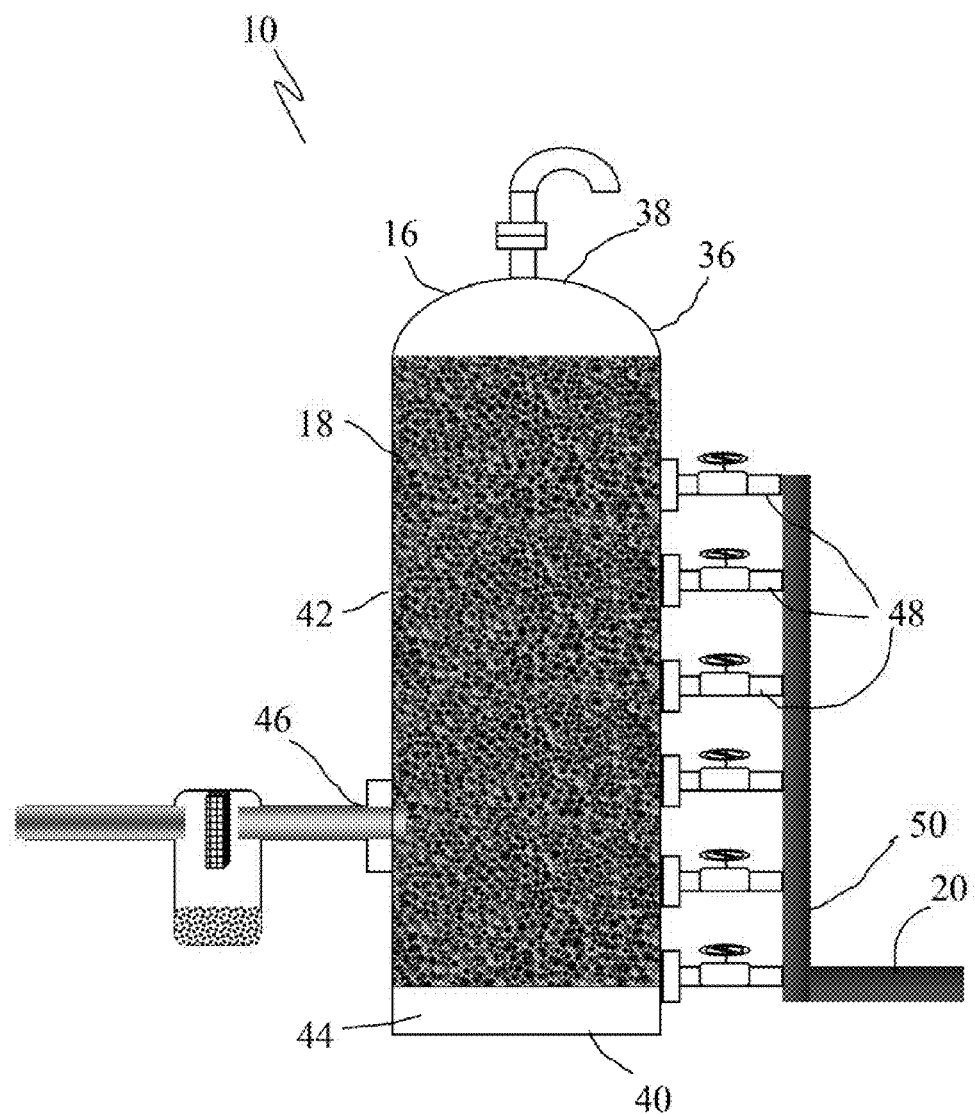
FIG. 2 is a side elevation view, in section, of the apparatus for liquid separation during agitation incorporated into a separation vessel.

Structure and Relationship of Parts:

Referring to FIG. 2, an apparatus for separating liquids during agitation 10 includes a support 16, a honeycomb cellular structure 18 and a capture assembly 20. As shown, support 16 is a separation vessel 36. Separation vessel 36 has a top 38, a bottom 40, a sidewall 42 defining an interior 44 and an inlet 46 positioned toward bottom 40 of separation vessel 36. Honeycomb cellular structure 18 is supported with interior 44 of separation vessel 36. A plurality of drain outlets 48 are connected to a drain manifold 50 to facilitate removal of liquid from separation vessel 36.

Honeycomb cellular structure 18 has a top 24, a bottom 26 and is formed from a plurality of enclosed cells 28. Referring to FIGS. 4 and 5, plurality of enclosed cells 28 limit and re-direct liquid movement in all directions so that agitation of the support has a negligible co-mingling effect. This enables a liquid separation interface to be established within honeycomb cellular structure 18. Each cell has an inlet 30 and an outlet 32 which are out of register to create a non-linear non-channeled migration path 34 from bottom 26 to top 24 of honeycomb cellular structure 18. Once the liquids have separated and the lighter liquid has made its way to top 24 of honeycomb cellular structure 18, the lighter liquid will be captured by capture assembly 20. Referring to FIG. 3, capture assembly 20 may be in the form of a vacuum 49, however it will be understood that various assemblies may be used to capture liquid from honeycomb cell structure 18.

Operation:

The fluid within holding tank 52 can then be mechanically pumped into separation vessel 36 which also contains three dimensional multi direction non-channeling porous permeable honeycomb cellular structure 18 that first disperses the captured fluid for further separation. The non-channeling membrane interferes with flow dynamics and allows gravity to passively separate the liquids. Then the liquids such as oil can be siphoned off near the top and deposited into other storage tanks and the less contaminated water can be discharged overboard or re-processed. This is done through a series of outlets 48 on the side of separation vessel 36.

Separation vessel 36 containing honeycomb cellular structure 18 allows the separation to continue by reducing co-mingling affects caused by the marine vessel motion due to heave/yaw/pitch/roll/ action of the tow vessel or barge depending on which system is deployed to hold separation vessel 36. Honeycomb cellular structure 18 within separation vessel 36 may consist of varied size porosity or orifices in order to meet the particular fluid Rheology/flow characteristics including viscosity, density and all others.

Combined System Boom Built onto Front of Barge which Also Holds the Secondary Non-Channeling Non-Linear Flow Separator System Structure and Relationship of Parts:

Referring to FIG. 3, an apparatus for separating liquids during agitation 10 includes a support 16, a honeycomb cellular structure 18 and a capture assembly 20. As shown, support 16 is a boat 54. Honeycomb cellular structure 18 is supported at a bow 56 of boat 54 and a channeling structure 58 is positioned at bow 56. Channeling structure 58 channels oil floating on the body of water toward honeycomb cellular structure 18. Floating booms 60 may be used to direct oil floating on the body of water toward channeling structure 58. Boat 54 may include a suction manifold, such as a vacuum 49, to draw less dense liquids out of honeycomb cellular structure 18 by force of suction.

Honeycomb cellular structure 18 has a top 24, a bottom 26 and is formed from a plurality of enclosed cells 28. Referring to FIGS. 4 and 5, plurality of enclosed cells 28 limit as well as re-direct liquid movement in all directions so that agitation of the support has negligible co-mingling effect. This enables a liquid separation interface to be established within honeycomb cellular structure 18. Each cell has an inlet 30 and an outlet 32 which are out of register to create a non-linear migration path 34 from bottom 26 to top 24 of honeycomb cellular structure 18. Once the liquids have separated and the lighter liquid has made its way to top 24 of honeycomb cellular structure 18, the lighter liquid will be captured by capture assembly 20. Referring to FIG. 3, capture assembly 20 may be in the form of a vacuum 49, however it will be understood that various assemblies may be used to capture liquid from honeycomb cell structure 18.

Operation:

The honeycomb boom can be attached to the interior or the front of a large barge with non channeling dispersion honeycomb structure. The structure allows quick adjustment of the orifice membrane size.

Marine support vessel 54 is towed or driven through co-mingled oil/water or held stationary down current of the contaminated oil/water and initial separation occurs at honeycomb cellular structure 18.

The initial separation is achieved through the forward motion driving the co-mingled oil/water into the passive separator and allowing the initial fluid separation to begin, then, the lighter density fluid can be vacuumed off into holding tank 52 held on boat 54.

The fluid is then mechanically pumped through the non-channeling multi direction flow paths in separation vessel 36. Separation vessel 36 also contains three dimensional multi direction non-channeling porous permeable honeycomb cellular structure 18 that first disperses the captured fluid for further separation. The non-channeling membrane interferes with flow dynamics and allows gravity to passively separate the liquids. Then the liquids such as oil can be siphoned off near the top and deposited into other storage tanks and the less contaminated water can be discharged overboard. This is done through a series of outlets 48 on the side of separation vessel 36.

Combined System Boom Built into a Moonpool Interior of the Barge which Also Holds the Secondary Non-Channeling Non-Linear Flow Separator System.

Structure and Relationship of Parts:

Referring to FIG. 3, marine vessel such as a barge 54 may have a significant section cut out where honeycomb cellular structure 18 is affixed to an interior 62 of a marine vessel or moonpool 66.

Operation:

This is also designed to utilize the honeycomb membranes however the boat 54 has a significant section cut out to where the honeycomb cellular structure 18 is affixed to marine vessel interior 62 or within a moonpool 66. This increases the surface area of honeycomb cellular structure 18 in the body of water.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An apparatus for separating liquids during agitation, comprising:
   a support;
   a honeycomb cellular structure supported by the support, the cellular structure having a top, a bottom and being formed from a plurality of enclosed cells which limit liquid movement in all directions so that agitation of the support has a negligible co-mingling effect enabling a liquid separation interface to be established within the cellular structure, each cell having an inlet and an outlet which are out of register creating a non-linear migration path from the bottom to the top of the cellular structure; and
   a capture assembly to capture less dense liquids after separation has occurred.

2. The Apparatus of claim 1, wherein the support is a separation vessel having a top, a bottom, a side wall defining an interior and an inlet positioned toward the bottom providing liquid communication with the interior, the cellular structure being supported within the interior of the separation vessel.

3. The Apparatus of claim 1, wherein the support is afloat, which supports the cellular structure in a partially submerged state within a body of water.

4. The Apparatus of claim 3, wherein the float is in the form of a marine vessel.

5. The Apparatus of claim 4, wherein the cellular structure is supported at a bow or interior of the marine vessel and a channeling structure is positioned at the bow that channels oil floating on the body of water toward the cellular structure.

6. The Apparatus of claim 5, wherein there are floating booms to direct oil floating on the body of water toward that channeling structure.

7. The Apparatus of claim 1, wherein the capture assembly includes a suction manifold to draw less dense liquids out of the cellular structure by force of suction.

8. The Apparatus of claim 1, wherein the capture assembly includes a plurality of drain outlets connected to a drain manifold.

* * * * *